United States Patent [19]

Jeppsson

[11] Patent Number: 4,698,773
[45] Date of Patent: Oct. 6, 1987

[54] ADAPTIVE FEED RATE OVERRIDE SYSTEM FOR A MILLING MACHINE

[75] Inventor: Jan Jeppsson, Bellevue, Wash.

[73] Assignee: The Boeing Company, Seattle, Wash.

[21] Appl. No.: 825,134

[22] Filed: Jan. 31, 1986

[51] Int. Cl.<sup>4</sup> .................. G05B 19/24; G05B 19/00
[52] U.S. Cl. .................................. 364/474; 364/148; 318/571; 318/646
[58] Field of Search ............... 364/148, 167, 474, 475; 318/561, 571, 572, 646; 408/10, 11, 12

[56] References Cited

U.S. PATENT DOCUMENTS

| | | | |
|---|---|---|---|
| 2,411,139 | 11/1946 | Roy et al. | 201/51 |
| 3,634,664 | 1/1972 | Valek | 318/571 |
| 3,720,120 | 3/1973 | Cutler | 318/571 |
| 3,728,595 | 4/1973 | Adams | 318/39 |
| 3,752,968 | 8/1973 | Pilafidis et al. | 235/151.11 |
| 3,759,139 | 9/1973 | Whetham | 90/11 A |
| 3,777,125 | 12/1973 | Whetham | 235/151.11 |
| 3,818,334 | 6/1974 | Rosenberg | 324/65 R |
| 3,849,712 | 11/1974 | Lankford et al. | 318/561 |
| 3,986,010 | 10/1976 | Lankford et al. | 235/151.11 |
| 4,078,195 | 3/1978 | Mathias et al. | 318/561 |
| 4,131,837 | 12/1978 | Whetham | 318/571 |
| 4,237,408 | 12/1980 | Frecka | 318/571 |
| 4,330,832 | 5/1982 | Kohzai et al. | 364/474 |
| 4,441,281 | 4/1984 | Gordiski | 51/165.87 |
| 4,471,443 | 9/1984 | Kinoshita et al. | 364/474 |
| 4,510,427 | 4/1985 | Nozawa et al. | 318/571 |
| 4,564,910 | 1/1986 | Smith et al. | 364/474 |
| 4,613,800 | 9/1986 | Teppsson | 318/646 |
| 4,617,635 | 10/1986 | Shimizu | 318/571 |

*Primary Examiner*—Jerry Smith
*Assistant Examiner*—John R. Lastova
*Attorney, Agent, or Firm*—Bruce A. Kaser

[57] ABSTRACT

A system is provided for adaptively limiting the feed rate of a milling machine's positioning axes during a milling operation. Normal operation of the milling machine is controlled by a numerical control system (26). The invention utilizes strain gauges (18, 20) which sense loading force on the cutting tool during milling. A computer (24) is operatively connected to the strain gauges (18, 20). The computer is programmed to receive signals from the strain gauges and to use such signals to automatically override the programmed feed rate in the numerical control system (20), to maintain a specified peak side load on the cutting tool.

6 Claims, 8 Drawing Figures

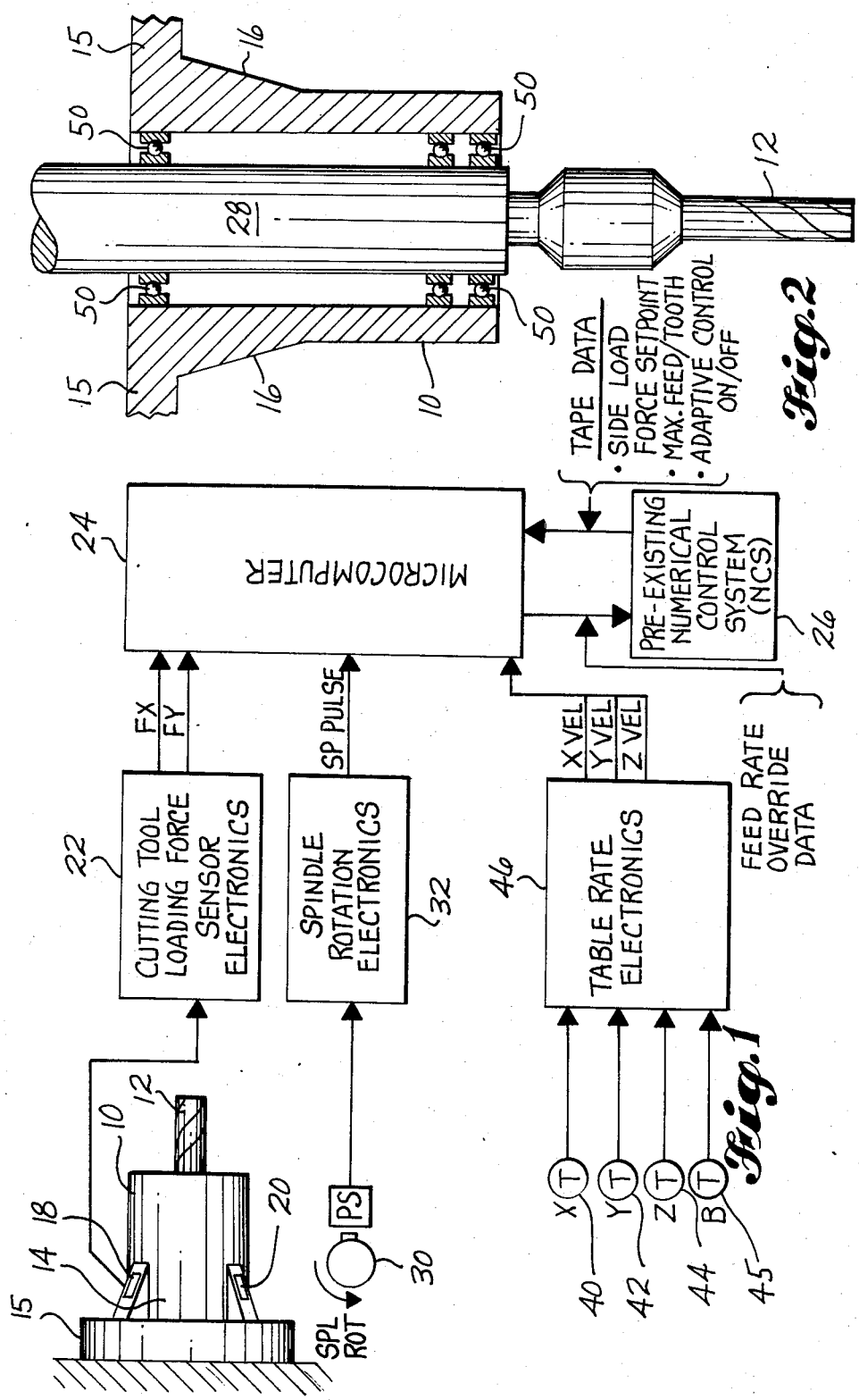

ic Field

This invention generally relates to milling machines controlled by numerical control systems. More specifically, this invention relates to a milling machine control system which limits milling machine feed rate according to feedback signals indicating loading force on the machine's milling or cutting tool.

2. Background Art

Milling machines controlled by numerical control systems were first introduced for commercial use in the early 1960's. Prior to that time, milling machines were manually controlled by a machine operator, such control typically including manually controlling the feed motion of the machine's table axes. For the most part, numerical control systems have eliminated such manual control. However, machine operators are still required to visually monitor operation of numerically controlled machines, to change workpieces, and at certain times to override the feed rate of the cutting tool regardless of the feed rate normally commanded by the numerical control system.

As would be familiar to a person skilled in the art, a numerical control system typically includes a digital computer which is connected to the machine servos by means of an interface. A set of preprogrammed instructions are fed into the computer by means of data tape, or similar means, to control a particular milling operation on a workpiece. The preprogrammed instructions typically include commanding a cutting tool feed rate.

As a practical matter, such systems are limited in that it is generally cost prohibitive for individual feed rates to be calculated for each type of cutting sequence encountered during a particular milling operation, particularly in the aerospace industry, which typically manufactures a large number of different parts each in very low volumes. Therefore, many systems in the aerospace industry are preprogrammed to command uniform feed rates such as 40 inches per minute (ipm) for aluminum and 5 ipm for steel workpieces, regardless of the cutting sequence.

This causes a problem because uniform feed rates can cause excessively high cutting tool loading when, for example, the tool is in one sequence cutting through a varying cross sectional area of a workpiece. Since it is impractical to account for this by varying feed rate commands in the preprogramming of the system, the machine operator must constantly monitor machine operation and override the programmed feed rate when sound, vibration, or other physical effects manifest a feed rate that is too high. The result is that a milling operation tends to progress at a very inefficient rate. The machine operator, in using his subjective judgment, usually slows down the feed rate to a very low rate, thereby overcompensating for actual tool loading to give himself a sufficient margin of error. Because of this, it has long been known that a substantial increase in the productivity of numerically controlled machines could be achieved if manual feed rate override could be eliminated. Elimination of manual feed rate override would permit a cutting tool to be driven closer to its physical limits and would result in not only a more efficient milling operation, but would also save a substantial amount in labor costs if an operator was no longer required to monitor machine operation.

Many attempts have been made to address this problem resulting in the development of several automatic feed rate override control systems. These systems are usually referred to as adaptive control systems because the control characteristic which limits feed rate changes automatically according to cutting conditions.

One type of system, known in the art and commercially developed, measures horse power consumption of the cutting tool. In this system, horse power consumption is used as an indicator of tool loading. Basically, the horse power measured is not permitted to exceed a certain preselected value.

This system is rather limited in that it has both poor sensitivity and a long response time. These two limitations mean that the system will not operate effectively for limiting feed rate in milling operations other than those wherein rough cuts are made. Finer cuts, or when workpiece cross section varys, require very quick response to changes in cutting tool load.

It has long been known that side loading force on a cutting tool is the parameter which must often causes cutting tool breakage if, of course, the force is allowed to increase above a certain value. Side loading consists of two components; a radial component and a tangential component. The resultant force from these two components makes up the total side loading force. The horse power sensing system mentioned aboved senses indirectly only one of these two components, i.e., the tangential component. As a cutting tool becomes dull, however, the radial force on the tool increases significantly but the tangential component remains fairly constant. Therefore, a horse power sensing system cannot properly detect increased side loading force resulting from cutting tool wear. Further, another condition which can occur during a cutting operation is chip loading. This is typically a situation where chips build up in the flutes of a cutting tool and thus create very large radial forces on the tool. This also cannot be sensed by a horse power sensing system.

A horse power sensing system is extremely inadequate in limiting cutting tool loading when the radial depth or cross section of a cut decreases during a cutting operation. When this happens, the average cutting tool loading force decreases which therefore lowers cutting tool horse power requirements. A typical horse power sensing system would, as a result, increase the feed rate thus causing higher peak forces on the cutting tool. This would potentially result in cutting tool breakage.

Another type of adaptive control system known in the art utilizes a special sensor ring located immediately outwardly of an outer spindle bearing on the particular milling machine on which this system is used. The sensor ring measures, in two perpendicular directions, the radial distance between a rotating spindle shaft surface, to which a cutting tool is attached, and the stationary housing surrounding the race of the bearing. As side loading increases on the cutting tool, the races of the bearing compress on one side and expand on the opposite side.

As a practical matter, this type of system does not have very high sensitivity. This type of system requires preloading to elminate play between the balls and races in the bearing. Only small expansions and compressions occur even when the cutting tool is subjected to very large side loads. It is known that this type of system is expensive, costly to install, and time consuming to calibrate. For example, calibration has to be repeated in accordance with wear on the bearing.

Still other types of known adaptive control systems have been disclosed in the United States patent literature. Some patents which are pertinent to the present invention are as follows: U.S. Pat. No. 4,471,443 issued to Kinoshita et al. on Sept. 11, 1984; U.S. Pat. No. 4,441,281 issued to Gordiski on Apr. 10, 1984; U.S. Pat. No. 4,131,837 issued to Whetham on Dec. 26, 1978; U.S. Pat. No. 4,078,195 issued to Mathias et al. on Mar. 7, 1978; U.S. Pat. No. 3,986,010 issued to Lankford et al. on Oct. 12, 1976; U.S. Pat. No. 3,849,712 issued to Lankford et al. on Nov. 19, 1974; U.S. Pat. No. 3,377,125 issued to Whetham on Dec. 4, 1973; U.S. Pat. No. 3,759,139 issued to Whetham on Dec. 18, 1973; U.S. Pat. No. 3,752,968 issued to Pilafidis et al. on Aug. 14, 1973; U.S. Pat. No. 3,728,595 issued to Adams on Apr. 17, 1973; and U.S. Pat. No. 2,411,139 issued to Roy et al. on Nov. 12, 1946.

Of all the above patents that which is probably of most pertinence to the present invention is Adams U.S. Pat. No. 3,728,595. Adams discloses a system that automatically controls the feed rate of a milling machine by using a sensor that measures actual milling force exerted by a cutting tool during a milling process. However, Adams lacks certain features which are present in the invention disclosed herein. In the first place, Adams fails to properly address the large difference between peak loading force and average loading force which occurs during each rotation of a cutting tool during milling. Secondly, the Adams system fails to incorporate cutting tool dynamic lag, which is very important for automatic adjustment of servoloop band width in an adaptive control feed rate override system. This becomes especially important when using cutting tools commonly known as long end mills which pass through cuts of varying cross section. Adams also fails to provide the sensitivity of the present invention in that Adams fails to compensate for false loading force signals caused by irregularities in a milling machine's spindle shaft.

The teachings of the remaining above-cited references include the same short comings cited above for Adams. The present invention provides a solution to the above stated problems and represents an improvement over the above-described previously existing adaptive control systems.

3. Disclosure of the Invention

The present invention provides a system which can adaptively limit the feed rate of a milling machine's rotating cutting tool. The invention particularly addresses the problem of adapting loop stability in conjunction with cutting tools commonly known as end mills.

Normally, cutting tool feed rate is controlled by commands from a numerical control system. The invention adaptively overrides such feed rate commands when cutting tool feed rate becomes too high such that the loading force on the cutting tool may possibly cause breakage.

The invention includes means for sensing a peak loading force (side loading) on the cutting tool in the form of strain gauge sensors operatively mounted to a spindle housing. The sensors have a short response time (1 msec) and high sensitivity so that many loading force measurements can be made per revolution of the cutting tool. The peak loading force per revolution is determined and used to control cutting tool feed rate. The invention is sufficiently sensitive so that loading forces as low as a few pounds can be measured.

An adaptive feed rate limiting means, in the form of a computer connected to the sensing means or sensors, uses the peak loading force per revolution to set a limit to cutting tool feed rate. The limit is set so that the peak loading force will substantially match a preselected maximum loading force, or force set point, on the cutting tool. The preselected maximum loading force is a given system or computer input parameter determined by such factors as cutting tool length, diameter and other tool characteristics.

An override means limits cutting tool feed rate in response to the feed rate limit set by the computer. The override means adjusts the feed rate, typically from 0 to 120% of the feed rate commanded by the numerical control system's program medium. If the computer sets a maximum feed rate which is below the feed rate commanded by the numerical control system, then the override means causes the feed rate to be limited to that which is set by the computer.

As in many typical milling machines, the cutting tool is or may be connected to a rotatable spindle that is received within a housing and supported by bearings. The housing is connected at its base portion to the milling machine. The strain gauge sensors are mounted to the milling machine adjacent the spindle's base portion and sense compressive and tensile forces in the base portion caused by loading on the cutting tool. It is possible, for example, for the strain gauges to be mounted to buttresses which stiffen the connection between the housing and the milling machine. In response to the sensed compressive and tensile forces, the strain gauge sensors generate a loading force signal which is received by the computer. Before the computer receives the loading force signal, however, it is first amplified. The computer is programmed to process the amplified signal, and to adjust it in order to compensate for any mechanical defects in the spindle which would corrupt the accuracy of the loading force signal.

The computer is further programmed for adjusting the amplified and compensated loading force signal to further compensate for dynamic tool lag of the cutting tool. This fully compensated signal, i.e., compensated for both spindle defects and dynamic tool lag, permits the invention to provide extremely high sensitivity to changes in cutting tool loading force.

The above mentioned override means typically is in the form of an operator controlled feed rate override switch present in many numerical control systems. For example, the switch is typically manually settable to some particular override position within a range of positions. Switch position or setting, which is a variable, can therefore be used to varibly limit the feed rate of the cutting tool.

In the present invention, the computer is operatively connected to a pre-existing numerical control system in a manner so that the programming of the computer controls that data from the feed rate override switch which is normally utilized by the numerical control system. In other words, the switch setting normally signals the numerical control system the maximum feed rate allowable. In the present invention, the computer program adjusts the virtual switch setting in accordance with the set limit resulting from the computer's processing of the measurement of peak loading force on the cutting tool. Of course, the set limit may change continually during any particular milling operation because tool loading will change as cutting sequences change.

The invention also includes means, by minor software and hardware additions, to control the feed rate so that either the cutter side load, the feed per tooth of the cutter, or the spindle torque or horse power is the constraining parameter. In some cases, the side load may be well below the load at which risk for breakage exists. However, it is still not desired to increase feed rate because too thick of chips can tend to clog the flutes of the cutter, resulting in an interruption of the milling process. Part finish requirements can also dictate a maximum value of the feed per tooth, which like the load set point is specified on the NCS part program medium. It is also possible that the spindle torque or horse power limit is reached before the side load on the cutter exceeds its safe set point.

The computer is also operatively connected to various milling machine servo-motors which actuate cutting tool feed rate. Typically, these motors are normally operated by feed rate commands from the numerical control system. However, the computer is programmed to generate servo-advance commands or signals which cause the motors to limit cutting tool feed rate in response to sudden changes in the setting of the feed rate override switch. These servo-advance commands are generated and are active in the short interim time between the time the virtual switch setting is changed and the time it takes for the numerical control system to react to such change. In this manner, the computer compensates for time delays inherent in the numerical control system's ability to react to changes in switch setting.

An advantage to the present invention is that it is readily adaptable to many milling machines controlled by currently existing numerical control systems. An aspect of the invention is that it provides an additional computer which takes over automatic operation of a feed rate override switch, which was previously operated manually. Any additional sensing electronics required for operation of the invention in connection with preexisting numerical control systems can be easily added to the milling machine, without substantially modifying the machine or the numerical control system. In this vein, the added computer can utilize the same data or other input parameters normally input into the numerical control system by means of tape data or otherwise.

The chief advantage of the present invention is that it provides extremely high sensitivity to rapid changes in cutting tool loading. The invention adaptively limits feed rate in accordance with changes in cutting tool loading force encountered during milling. Obviously, during any particular milling operation various milling sequences may occur, each of which may cause variations in the amount of tool loading. The invention is extremely responsive to such variations because it senses actual cutting tool loading many times during each revolution of the cutting tool. In this way, the invention avoids sensing average loading force per revolution, which is a major limitation to preexisting systems that are similar to the invention.

BRIEF DESCRIPTION OF THE DRAWING

Referring now to the drawings, wherein like reference numerals and letters refer to like parts throughout the various views, and wherein:

FIG. 1 is a schematic view of a milling machine controlled by a numerical control system, and shows an additional computer, operatively connected to strain gauges, for adaptively limiting cutting tool feed rate;

FIG. 2 is a side view of a rotating spindle and cutting tool, the spindle being received in a housing which is shown in cross-section;

BEST MODE FOR CARRYING OUT THE INVENTION

A. Description of the System

Figure 4:
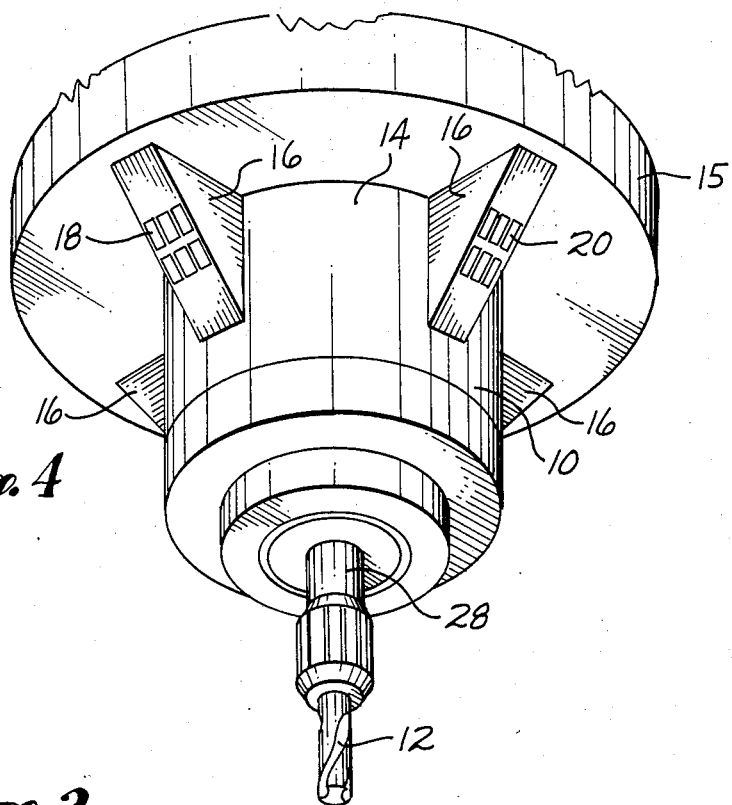
FIG. 4 is a pictorial view of the spindle and housing shown in FIGS. 1 and 3.

In most respects the present invention is a signal processing system which utilizes a microcomputer and a computer program in connection with a preexisting numerical control system (NCS). The invention provides feed rate override of the cutting tool feed rate normally commanded by the NCS by automatically controlling the data from a manual feed rate override switch to which the NCS was formerly responsive. A system constructed in accordance with the invention schematically shown in FIG. 1.

In the upper left hand portion of FIG. 1 is a schematic view of a spindle housing 10 from which a cutting tool or end mill 12 projects. The spindle housing 10 has a base portion 14 which is connected to a milling machine 15. Most of the milling machine 15 is not shown in the drawings. The spindle housing 10 is exemplary of many similar structures used in connection with milling machines and is well-known in the art. A plurality of strut-like supports or buttresses 16 may be used to stiffen the connection between the housing 10 and the milling machine 15. Attached to the buttresses 16 are two sets of strain gauge sensors 18, 20 which sense the side loading force on the cutting tool 12 during a milling operation. If no buttresses are used, the gauges are attached to the housing's cylindrical surface on four places 90 degrees apart.

Briefly, the strain gauges 18, 20 sense cutting tool side loading force during milling and generate an electrical signal indicative of such force. The signal is processed by special sensor electronics 22, which will be described later, and is converted from analog to digital form for further processing by a microcomputer 24. The microcomputer 24 is interfaced with a numerical control system (NCS) schematically indicated at 26, which normally controls milling machine operations, including cutting tool feed rate. As would be known to a person skilled in the art, the NCS 26 operates the milling machine by a pre-programmed numerical control tape, or the like.

The NCS 26 includes a feed rate override switch. Such switch is not shown in the drawings but would be familiar to a person skilled in the art. Formerly, and as was indicated above, the override switch was manually operated by a milling machine operator after sensing vibration, noise, smoke, etc. that indicated the NCS was commanding too high of a feed rate. In the present invention, manual operation of the switch is replaced and controlled by interfacing the microcomputer 24 and the NCS 26. The microcomputer 24 is operatively connected to the NCS, and programmed in a manner to be described below, so that the microcomputer adaptively controls the virtual but not the physical setting of the switch. Based on the loading force signals generated by the strain gauges 18, 20 the microcomputer 24 may continually change the virtual setting of the feed rate override switch in accordance with corresponding changes in cutting tool load or loading force.

With the exception of the strain gauges 18, 20, the cutting tool loading force sensor electronics 22, and the microcomputer 24, the system shown in FIG. 1 is representative of many typical milling machines controlled by numerical control systems. By way of example, a currently existing system of this type is a Sundstrand OM-2 machining center controlled by an Allen-Bradley 7320 numerical control system. The Allen-Bradley system has a four deck feed rate override switch, each deck controlling one bit in a four-bit code. The microcomputer 24 replaces the four bit data from the switch with data from its interface when the adaptive control system is activated. This type of system would be very familiar to a person skilled in the art.

As shown in FIG. 2, the cutting tool 12 is connected to a spindle shaft 28 which is received in the housing 10. The shaft 28 is driven by a motor not shown in the drawings. A spindle rotation sensor 30 generates an electrical signal indicating, in the Sundstrand Om-2 case, once per revolution the rotational position of the spindle during milling, and further generates an electrical pulse for each spindle rotation. This signal is processed by spindle rotation electronics 32 into a spindle pulse signal which is received by the microcomputer 24. The microcomputer also receives from machine table rate tachometers 40, 42, 44, 45 and their associated electronic circuitry 46, the rate of table movements for the axes of possible movement defined by an x axis, a y axis, a z axis, and a b axis as an example.

The spindle rotation sensor 30, the tachometers 40, 42, 44, 45 and their associated electronics 32, 46 are well-known system components of the above-referenced Sundstrand system, all of which would be familiar to a person skilled in the art.

Figure 3:
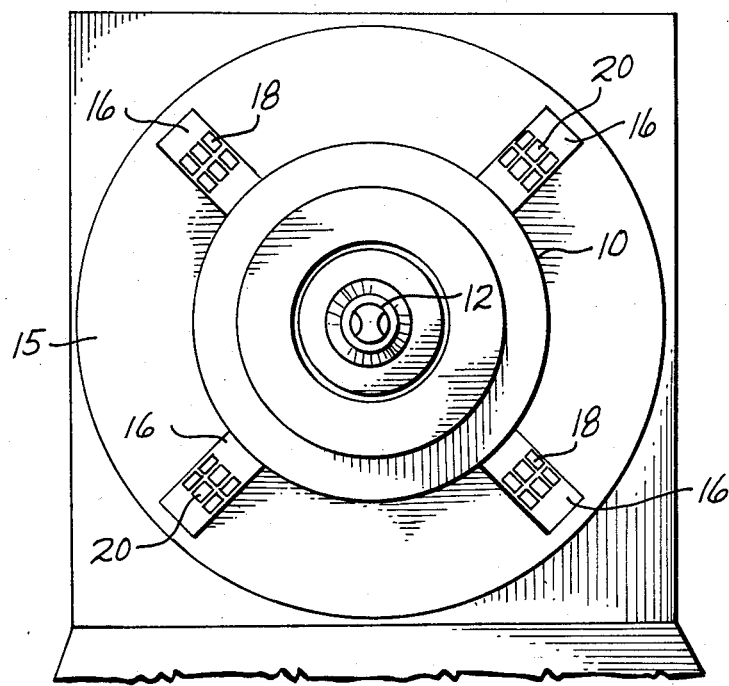
FIG. 3 is an enlarged frontal view of the spindle and housing shown in the upper left hand corner of FIG. 1.

FIGS. 3 and 4 show four buttresses 16 distributed around the perimeter of the housing 10. Each buttress 16 is located 90 degrees from each neighboring buttress. One set of strain gauges 18 is mounted to one pair of opposing buttresses, and the other set 20 is mounted to the remaining pair. This orients each set 18, 20 perpendicularly relative to each neighboring buttress. Having this configuration permits the strain gauges 18, 20 to measure compressive and tensile strain in the base portion 14 of the housing 10. Such strain is, of course, caused as a result of side loading forces on the cutting tool 12 during milling.

It should be mentioned that the above-described strain gauge configuration is described for particular application to a Sundstrand OM-2 machining center. Other milling machines may have other types of spindle housings and/or structures to which strain gauges 18, 20 could be installed such that they sense forces in two directions perpendicular to each other. In this case it would be necessary to mix the signals from the two sets of sensors in such a manner that no cross-coupling exists, i.e., when a force is applied along an x axis, the y axis output from the mixed signals should be zero and vice versa. It is not necessary that side load force components "FX" and "FY" correspond to the directions of machine motion coordinates. The force components should, however, be perpendicular to each other and to the spindle axis. Further, the structural configuration of some machines may require a third set of sensors to eliminate the effect axial loading forces have on side loading forces.

In the embodiment disclosed herein, each strain gauge set 18, 20 consists of two strain gauges connected together in series, one each being connected to a separate opposing buttress 16 as shown in FIG. 3 Each strain gauge in each set may have a resistance of 350 ohms making a total resistance of 700 ohms for the entire set. This permits the strain gauges 18, 20 to have a $\pm 15$ volt DC exitation placed upon them, which is typical for many analog systems. The use of $\pm 15$ volt exitation together with instrumentation amplifiers, like National Semiconductor Type LM321 amplifiers, permits the strain gauges to sense cutting tool sideloads as low as 1 to 2 lbs.

The actual hard wire connection between the computer 24 and the various electronics 22, 32, 46, strain gauge sensors 18, 20, spindle rotation sensor 30, and tachometers 40, 42, 44, 45 would be a matter of employing familiar techniques known to a person skilled in the art.

Adaptively limiting cutting tool feed rate is accomplished in the programming of the microcomputer 24. A microcomputer suitable for use in conjunction with the present invention is a single board microcomputer type OB68K1 made by OMNIBYTE, Inc. of Chicago, Ill. which utilizes a Motorola MC68000 microprocessor.

The microcomputer interfaces with the NCS 26 as schematically shown in FIG. 1. The actual hard wire connections between the microcomputer 24 and the NCS 26 are not shown and described herein since such connection would be a matter of common knowledge to a person skilled in the art. The programming of the microcomputer accompanies this specification and is submitted pursuant to the provisions of 37 C.F.R. 1.96(a)(2)(ii). The program causes the microcomputer 24 to perform the signal processing functions described below, and as a result, to set the feed rate override limit switch during milling.

B. System Programming and Software Requirements

Programming of the microcomputer 24 permits it to process loading force signals received from the strain gauges 18, 20 and to compensate such signals for mechanical imperfections in the spindle shaft 28. Mechanical imperfections in the spindle 28 make it behave as though it were slightly bent. The spindle 28 is supported by bearings 50 in the housing 10. As the spindle 28 rotates the bearings 50 are subjected to slight side loads, the direction of which follow the rotation of the shaft. Since the strain gauges 18, 20 and sensor electronics 22 exhibit extremely high sensitivity to loading forces, these side loads affect the accuracy of the signals produced by the strain gauges 18, 20.

Figure 5:
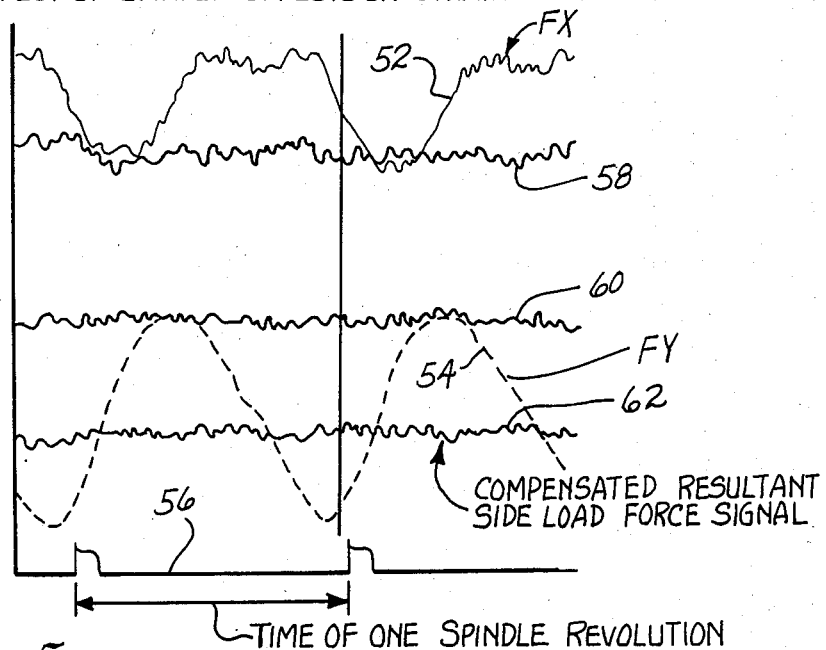
FIG. 5 is a graph showing how mechanical spindle defects affect cutting tool loading force signals generated by strain gauges that are mounted to the housing shown in FIGS. 1, 3 and 4, and further shows how the invention compensates for spindle defects.

The microcomputer 24 stores in memory the zero load strain gauge signals which are output from strain gauges 18, 20 when the known load on the cutting tool 12 is zero. The load is zero, for example, when the tape program controlling the NCS 26 indicates that a rapid traverse repositioning of the machine table is performed, during which operation no cutting can occur. The amplifiers in the sensor electronics 22 output two signals; one indicating loading force in the x direction (FX), and the other indicating loading force in the y direction (FY). FIG. 5 shows exemplary FX and FY signals, respectively, at 52 and 54. The time elapsed between each spindle pulse (indicating one spindle rotation) is shown on line 56. This time may be 0.075 seconds, by way of example. The zero load data, stored in the microprocessor, is subtracted from the strain gauge signals 52, 54 to provide compensated signals. Line 58 shows the FX signal compensated for spindle defects. Likewise, line 60 shows the compensated FY signal.

The compensated FX and FY signals are combined to provide a compensated resultant side load force signal (RESF) which is used to calculate the proper setting of the feed rate override switch. This signal is shown at 62 in FIG. 5. and is calculated from signals 58, 60 pursuant to the following equation:

$$RESF = \sqrt{(FX)^2 + (FX)^2}$$

In preferred form, the above equation is calculated in the microcomputer once every millisecond. What this means is that RESF is calculated many times for each spindle revolution. For example, if the time of one spindle revolution is 0.075 seconds, RESF is calculated seventy-five times during that particular revolution. The microcomputer 24 calculates and stores the largest RESF value during each revolution, which is designated as the largest peak side loading force which occurs during the revolution (LPKCRN). After each revolution, as defined by the spindle pulse signal from rotation sensor 30, the LPKCRN calculation is moved into a memory location in the microprocessor, and is defined in the computer's memory as LPKLRN (largest peak of last revolution). An LPKLRN calculation is therefore made for each spindle rotation and is used to generate an adaption control feed back parameter (ACFBK).

Under static conditions, i.e., if cutting tool loading remains constant from one revolution to another, ACFBK is equal to LPKLRN. However, if cutting tool loading changes from one revolution to the next, the LPKLRN parameter is adjusted to account for dynamic tool lag of the cutting tool 12.

Figure 6:
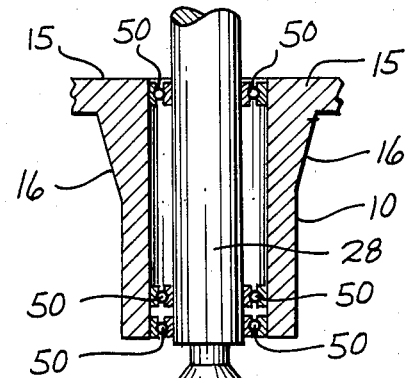
FIG. 6 is a view like FIG. 2, but shows the cutting tool during a milling operation and illustrates bending and dynamic tool lag of the cutting tool.
Figure 7:
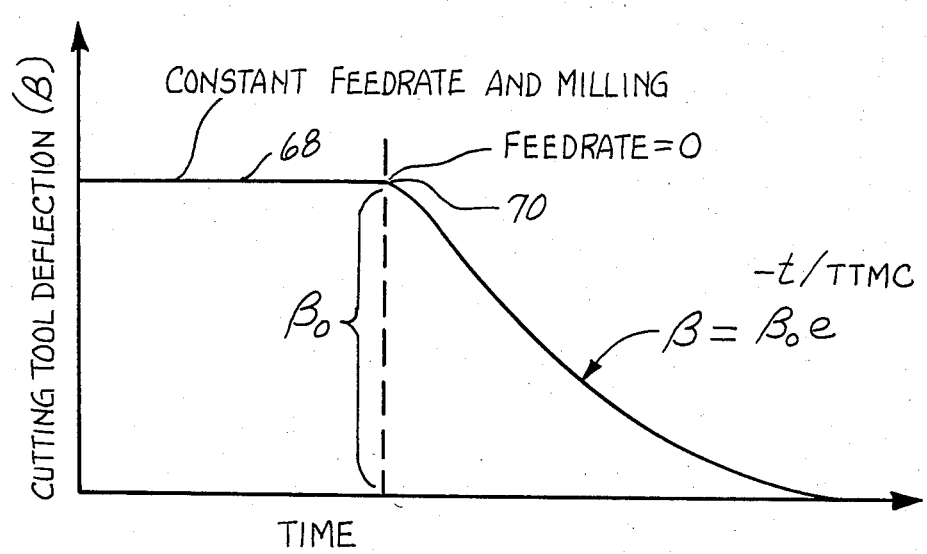
FIG. 7 is a graph showing variation in cutting tool bending or deflection as a function of time, to illustrate cutting tool dynamic lag.

Referring now to FIG. 6, assume the cutting tool 12 is cutting or milling a workpiece 66, and is moving at a constant feed rate and rotational speed (RPM) in the direction (feed direction) indicated by arrow 64. The side loading force on the cutting tool 12 causes it to bend a small amount indicated by the deflection "B" in FIG. 6. The direction of the maximum bending is not always in the direction opposite the feed direction because the tangential force component on the tool is much larger (typically by 5 to 10 times) than the radial component. If the feed rate suddenly changed to zero, meaning a complete stop in cutting tool movement (other than tool rotation), the deflection B resulting from the side loading decreases at an exponential rate. Correspondingly, the side load also decreases at an exponential rate. This phenomenon is shown in FIG. 7. Line 68 indicates cutting tool deflection if cutting tool feed rate remains constant, and if there are no other variations in the workpiece such as cross section, for example. There is a point in time, designated at 70, where the feed rate goes to zero. The deflection of the cutting tool 12 then decreases by the following equation:

$$B = B_o e^{-t/TTMC}$$

wherein "t" corresponds to time and TTMC corresponds to the tool time constant of the cutting tool.

TTMC is calculated according to the following equation:

$$TTMC = \frac{CMPL \times K1}{K}$$

The factor K1 is due to tangential to radial force ratio and varies from 3 to 10 depending on the particular material being cut. CMPL is the resulting compliance of both the cutting tool 12 and the spindle shaft 28 in inches per pound. This parameter multiplied by the factor K1 may be input into the computer program from data provided to the NCS 26, for example. As a person skilled in the art would know, it is derived from cutting tool dimension and flute data.

The value of K in the above equation is calculated in the microcomputer program by the following equation:

$$K = LPKLRN / \sqrt{(VX)^2 + (VY)^2}$$

wherein VX and VY are machine table rates in the x and y directions, respectively, as measured by tachometer sensors 40 and 42.

To account for tool lag, the ACFBK parameter is adjusted pursuant to the following mathematical relationship:

$$ACFBK = LPKLRN + \frac{TTMC * d(LPKLRN)}{dt}$$

where TTMC is defined above and dt equals the time interval between calculations of ACFBK. d(LPKLRN) is the change in LPKLRN from the immediately preceeding calculation of ACFBK.

The need for compensating for dynamic tool leg results from the desired objective of having an adaptive feed rate override system that has a fast response to changes in cross section of cut made by the cutting tool 12. The lag time in ACFBK, without compensating for tool lag, would cause instability in the servo-loop controlled by the microcomputer 24 which controls the correct setting of the feed rate override switch. Specifically, compensating for dynamic tool lag permits a high band-width in servo-loop control, thereby preventing unstable oscillations around the correct switch setting calculated by the computer program.

The value of TTMC will depend on the K value of the cutting tool 12. The value of K will in turn vary with certain milling parameters such as cross section of cut, material hardness, cutter wear and spindle speed. The present invention provides an adaptive control feed rate limiting system which dynamically sets a feed rate limit while automatically adapting to these parameters. The invention also provides a system that adapts automatically to the maximum possible servo-loop band width achievable for a particular spindle speed. This is accomplished by the computer programming which automatically selects the optimal whole number of spindle revolutions, if more than one, which should occur between calculations of ACFBK. One revolution is selected if the spindle speed is less than approximately 400 RPM, for example.

In preferred form, the setting of the feed rate limit switch is calculated by the microcomputer within a maximum of one millisecond after each new ACFBK parameter is calculated. The switch setting is calculated by predicting that particular setting which gives a peak value of loading force on the cutting tool 12 equal to a preselected maximum loading force or force set point. The actual value of the force set point depends on the type of cutting tool used for milling. For example, force set point will vary in accordance with such parameters as cutting tool length, diameter, and number of cutting tool flutes. Force set point is a program input parameter which may be received by the microcomputer from the NCS 26. In preferred form, for example, the force set point is initially input as tape data, or the like, into the NCS 26. The basic equation in the computer's program for setting the limit switch is as follows:

$$FROVSW_{N+1} = FROVSW_N * FSTPNT/ACFBK$$

where
$FROVSW_N$ = current position of limit switch
$FROVSW_{N+1}$ = new position of limit switch
FSTPNT = force set point Assuming the previously mentioned Allen-Bradley NCS is ued in conjunction with the invention, the program's calculating algorithm is such that a new switch setting must differ by ⅝ths or more of the incremental value between switch settings for a change in switch setting to take place. This eliminates the possibility of oscillating back and forth between two different settings if the correct setting turns out to be exactly halfway between two settings.

The invention as thus described is specifically designed for an NCS having a feed rate override switch that provides only step wise override capability. For example, the Allen-Bradley NCS, which is used on many milling machines, has thirteen positions or settings on the limit switch, ranging from 0 to 120% of NCS programmed feed rate. That is, the increment between switch positions is 10%. The present invention can be used in conjunction with this type of system, or the invention has the further capability for use with an NCS having continually variable override capability. This latter capability would provide superior control, particularly in the low range of cutting tool feed rates.

In addition to setting the override switch during milling, the microcomputer 24 is programmed to provide a means for changing the machine axis table rates so that they respond quickly to changes in switch setting. Typically, machine axis rates, which are driven by machine servo-motors, will not change instantaneously in correspondence with a new switch setting. For example, the previously mentioned Allen-Bradley 7320 NCS requires a certain time to recognize a new switch setting and to accordingly calculate a new incremental rate in the feed rate commands set to various machine servo-motors. Further, the various motors hav a certain lag time in responding to NCS commands because of mass, and compliance of the machine drive system to its loading. By way of example, the Allen-Bradley NCS delay time, including servo-motor response time thereto, may be as much as 50 milliseconds on the Sunstrand OM-2 machine. A delay of this amount could cause an unacceptably large overshoot of the force set point by the cutting tool loading if, for example, a relatively stiff cutting tool suddenly entered a large increase in workpiece cross section; or if the cutting tool suddenly entered a workpiece at a maximum programmed rate (120% of NCS programmed rate in the Allen-Bradley system).

In addition to delay in machine axis table rate response, another delay is present which is inherent in the method of calculating the above-mentioned ACFBK parameter. If, for example, a large cutting load increase happens shortly after the time at which the last ACFBK value was calculated, no change in switch setting would occur until the next calculation of ACFBK. This could also result in an overshoot in cutting tool loading. The invention incorporates two additional features which abate these two above-described delay problems.

Figure 8:
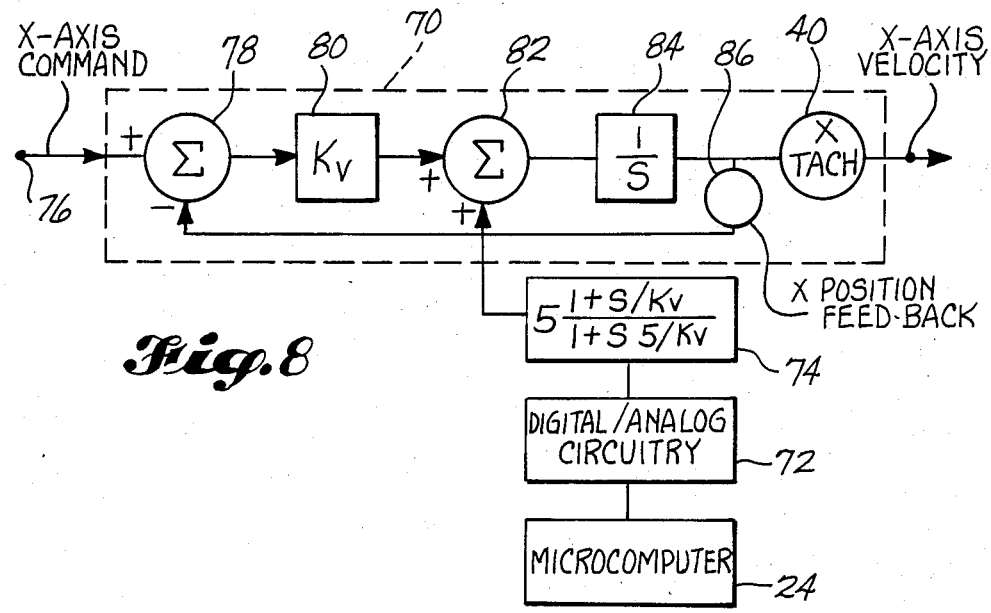
FIG. 8 is a schematic drawing showing a portion of the control circuitry of both the numerical control system and the invention, which is used to actuate milling machine servo-motors for the purpose of both normally controlling and limiting cutting tool feed rate.

The first feature relates to servo-advance signals generated by the present adaptive control system. One signal is generated for each axis of the machine. Referring now to FIG. 8, the computer 24 is programmed to generate independent servo-advance pulses or signals. FIG. 8 illustrates how the generated servo-advance pulses are input into the preexisting servo-motor control system of the NCS 26.

The circuitry in FIG. 8, enclosed by the dashed lines 70, indicates the preexisting NCS control circuitry present on the Sundstrand/Allen-Bradley machine for only the x feed axis. The circuitry 70 shows how the NCS inputs x axis feed rate commands to a machine servo-motor for that axis. Such circuitry is typical for many NCS controlled milling machines, and would be familiar to a person skilled in the art. Control circuitry for the other axes is substantially the same and therefore does not need to be described herein. The functions 78 and 80 may in some systems be part of the software.

The circuitry 70 normally receives an x-axis command 76 from the NCS. This command, for example, is first transmitted to a summing amplifier 78. From there, an amplifier circuit 80 processes the command and transmits it onwardly to another summing amplifier 82. The signal is then transmitted from summing amplifier 82 to a servo amplifier and motor 84, which then causes the servo-motor for that axis to operate the table rate at the velocity commanded by the NCS. Also, a position feed back signal from a position sensor 86 is transmitted back to the first summing amplifier 78.

When the invention senses a change in cutting tool side load, and commands a new override switch setting as was described above, there will be a significant delay in any change in x-axis command 76 as a result of switch setting changes. Therefore, the amplifier 82 in circuitry 70 is directly connected to an analog circuit 74 for receiving a servo-advance signal from the computer 24. The signal from analog circuit 74 causes the motor to attain the velocity of the x axis table rate which corresponds to the new switch setting, before the NCS sends position commands with the new rate.

The servo-advance pulse or signal generated for the x axis by the computer 24 is transmitted from the computer 24 through suitable digital/analog circuitry 72 which transforms computer generated data from digital into analog form. Amplitude and duration of the analog pulse is controlled by the program in the computer 24. The generated pulse has an amplitude proportionate to the velocity V of the x axis table rate modified proportionately by the relative change in switch setting. V is measured by tachometer 40. After passing through the analog/digital circuitry 72, the pulse then pass through the analog circuit 74 having the below transfer function:

$$G\left[\frac{1 + S/Kv}{1 + 5\,S/Kv}\right]$$

wherein S is a Laplace operator and Kv is the gain (1/sec) in the axis servo-loop. The signal from the analog circuit 74 is then input into the NCS x-axis circuitry 70.

It is the ramp component of the above transfer function, (see 74, FIG. 8), and specifically the integrating term Kv/S of the function which compensates for the delayed change of rate of the x-axis command 76 input from the NCS. The denominator of G causes the integrated portion of the signal to decay with a time constant of 5/Kv seconds, so that machine servo-motors will once again normally respond to commands from the NCS after a period of time. Software could be written for shaping the pulse instead of using the analog circuit (G). The microcomputer 24 is programmed so that its servo-advance pulses will be approximately 30 to 50% longer than the known NCS delay with the resultant effect being that any transients induced by the servo-advance pulses will have reduced amplitude. The net effect of the generated servo-advance pulses is that the axis rates are changed within a few milliseconds after a different limit switch setting is calculated and the actual setting is changed. This effectively reduces any overload on the cutting tool 12 caused by NCS delay.

It should be appreciated, and as a person skilled in the art would know, that computer generated servo-advance pulses may or may not be necessary depending on the particular milling machine and NCS to which the invention is adapted. The above description assumes the invention will be used in conjunction with the Allen-Bradley 7320 NCS system.

The other or second feature of the invention regarding system delay is a programmed quick slow down capability. The computer 24 is programmed so that if the cutting tool load at any time between two consecutive ACFBK calculations exceeds 125½% of the force set point, then the feed rate switch is automatically set, within one millisecond, to 20% of the maximum feed rate. Further, if the switch was initially set at 20% when such event occurred, then the feed rate switch is automatically set to 10%, or to "hold" if the switch was originally set at 10%. The new switch setting is maintained until a time of two ACFBK calculation periods elapse.

The above-described quick slow down feature is very effective when the cutting tool 12 initially enters a workpiece. At such time, the cutting tool is "air cutting" and could be proceeding at a feed rate that is typically 120% of the programmed rate. The reason for this is that during air cutting the cutting tool loading force signals have a very low level, leading to maximum switch setting of 120% per the formula on line 7 of page 19. If not for the quick slow down feature, the actual cutting tool loading force could easily build up to an unacceptably high level upon initial entry of the cutting tool into the workpiece.

Actual tests on the above-described invention show that the invention controls feed rate so that cutting tool loading force does not exceed 25% above the force set point. Force set points as low as 20 lbs. have been used successfully with a 0.125 inch diameter and 1 inch long end mill. An air cutting feed rate of twelve times the feed rate during cutting has proven feasible using the invention.

Although the description provided herein is addressed to side loading forces on a cutting tool, it should be appreciated that the present invention could be adapted to thrust loads and is therefore not limited in this sense.

The above description of the best mode for carrying out the invention has been provided herein for illustrative purposes only. The above-described computer programming accompanies herewith. A person skilled in the art could easily utilize this program in conjunction with the above-described Sundstrand/Allen-Bradley system and OMNIBYTE computer to practice the invention. It should be appreciated that the above description should not be construed as limiting the spirit and scope of the invention in any manner. The invention is to be limited only by the appended claims which follow, in accordance with the established doctrines of patent claim interpretation.

What is claimed is:

1. A system for adaptively limiting the feed rate or rate of translational movement of a rotating end mill during a milling operation, wherein the feed rate of said end mill is normally controlled by commands from a numerical control system, said feed rate limiting system comprising:

means for continuously sensing side loading force acting on said end mill during said milling operation, wherein said sensing means senses variations in said side loading force which occur over the period of each respective end mill revolution, and wherein said sensing means continuously generates a loading force signal as said end mill rotates indicating the magnitude of said side loading force, including variations thereof during each revolution;

adaptive feed rate limiting means, connected to said sensing means, said limiting means monitoring the magnitude of said side loading force, as indicated by said generated signal, periodically a certan number of times during each end mill revolution, and determining from said monitoring the peak side loading force acting on said end mill during each revolution, and using said determined peak force to set a limit to end mill feed rate where said peak force substantially matches a preselected maximum loading force acting on said end mill, and further, when said peak force changes from one revolution to the next, said adaptive feed rate limiting means further respondingly changes said feed rate limit, and in such situation, said adaptive feed rate limiting means calculates dynamic tool lag of said end mill which occurs when peak force changes from one revolution to the next, and uses said tool lag to adjust the magnitude of change in setting feed rate limit from one revolution to the next; and including feed rate override means for limiting end mill feed rate to said set feed rate limit, regardless of the feed rate commanded by said numerical control system.

2. The system of claim 1, wherein said feed rate override means includes a feed rate override switch operatively connected to said numerical control system, said switch being settable to limit the feed rate of said end mill, with the limit of feed rate varying in accordance with variation in switch setting, and wherein said adaptive feed rate limiting means is operatively connected to said numerical control system, to set said switch in accordance with said feed rate limit.

3. The system of claim 2, wherein said milling machine includes servomotors for controlling end mill feed rate, said motors being operatively connected to said numerical control system and normally responding to feed rate commands received therefrom, and further, such feed rate commands normally being limited by the setting of said switch, and wherein said adaptive feed rate limiting means includes means, operatively connected to said motors, for generating servo-advance signals to control said motors to limit end mill feed rate, said servo-advance signals being generated in response to changes in said switch setting, with said motors responding to said servo-advance signals to control feed rate independently of any feed rate commands received by said motors from said numerical control system.

4. The system of claim 1, wheren said end mill is connected to a spindle that is rotatably connected to and received within a housing, said housing being connected to a milling machine, and with
said sensing means including strain gauge means mounted to said milling machine, in a position for sensing compressive and tensile forces in said machine, wherein said compressive and tensile forces are caused by certain loading forces acting on said end mill and said spindle, said loading forces having a component attributable to said side loading force acting on said end mill, and another component attributable to eccentric rotation of said spindle in said housing caused by certain spindle defects, said strain gauge means generating a signal from said compressive and tensile forces that indicates said certain loading forces and which includes said two components thereof, with said adaptive feed rate limiting means receiving said signal from said strain gauge means and eliminating from said signal that component caused by said spindle defects, to produce a signal substantially indicative of actual side loading force acting on said end mill.

5. The system of 4, wherein said feed rate override means includes a feed rate override switch operatively connected to said numerical control system, said switch being settable to limit the feed rate of said end mill, with the limit of feed rate varying in accordance with variation in switch setting, and wherein said adaptive feed rate limiting means is operatively connected to said numerical control system, to set said switch in accordance with said feed rate limit.

6. The system of claim 5, wherein said milling machine includes servo motors for controlling end mill feed rate, said motors being operatively connected to said numerical control system and normally responding to feed rate commands received therefrom, and further, such feed rate commands normally being limited by the setting of said switch, and wherein said adaptive feed rate limiting means includes means, operatively connected to said motors, for generating servo-advance signals to control said motors to limit end mill feed rate, said servo-advance signals being generated in response to changes in said switch setting, with said motors responding to said servo-advance signals to control feed rate independently of any feed rate commands received by said motors from said numerical control system.

* * * * *

UNITED STATES PATENT AND TRADEMARK OFFICE
CERTIFICATE OF CORRECTION

PATENT NO. : 4,698,773
DATED : October 6, 1987
INVENTOR(S) : Jan Jeppsson It is certified that error appears in the above-identified patent and that said Letters Patent are hereby corrected as shown below:

Column 2, line 23, "must" should be -- most --.

Column 6, line 40, after "invention", insert -- is--.

Column 8, line 21, "Fig. 3" should be -- Fig. 3. --

Column 10, line 52, "leg" should be -- lag --.

Column 11, line 36, "ued" should be -- used --.

Column 11, line 67, "set" should be -- sent --.

Column 11, line 68, "hav" should be -- have --.

Column 13, line 30, after "(G).", begin a new paragraph.

Column 13, line 51, "1251%" should be -- 125% --.

Claim 1, column 14, line 51, "certan" should be -- certain --.

Signed and Sealed this

Third Day of May, 1988

*Attest:*

DONALD J. QUIGG

*Attesting Officer*  *Commissioner of Patents and Trademarks*